(12) United States Patent
Wagner

(10) Patent No.: US 10,746,265 B2
(45) Date of Patent: Aug. 18, 2020

(54) ADJUSTABLE BRACKET FOR ALTERNATOR AND RELATED PRODUCTS

(71) Applicant: Thomas E Wagner, Fenton, MO (US)

(72) Inventor: Thomas E Wagner, Fenton, MO (US)

(73) Assignee: Wagner Products Company, Fenton, MO (US)

( * ) Notice: Subject to any disclaimer, the term of this patent is extended or adjusted under 35 U.S.C. 154(b) by 417 days.

(21) Appl. No.: 15/732,067

(22) Filed: Sep. 12, 2017

(65) Prior Publication Data
US 2018/0080528 A1 Mar. 22, 2018

Related U.S. Application Data

(60) Provisional application No. 62/495,403, filed on Sep. 12, 2016.

(51) Int. Cl.
| | | |
|---|---|---|
| *F16H 7/14* | (2006.01) | |
| *F02B 67/06* | (2006.01) | |
| *F16H 9/26* | (2006.01) | |
| *F16H 7/08* | (2006.01) | |

(52) U.S. Cl.
CPC ............... *F16H 7/14* (2013.01); *F02B 67/06* (2013.01); *F16H 9/26* (2013.01); *F16H 2007/088* (2013.01); *F16H 2007/0842* (2013.01); *F16H 2007/0865* (2013.01); *F16H 2007/0893* (2013.01); *F16H 2007/0897* (2013.01)

(58) Field of Classification Search
CPC ............... F16H 7/14; F16H 2007/0893; F16H 2007/0842; F16H 2007/0889; F16H 7/18; F16H 9/16; F02B 67/06
See application file for complete search history.

(56) References Cited

U.S. PATENT DOCUMENTS

| | | | | |
|---|---|---|---|---|
| 3,922,927 | A * | 12/1975 | Shiki | F02B 67/06 474/113 |
| 4,512,752 | A * | 4/1985 | Brenneman | F16H 7/14 474/114 |
| 4,887,992 | A * | 12/1989 | Dixon | F02B 67/06 474/101 |
| D330,154 | S * | 10/1992 | Wagner | D13/122 |
| 7,194,994 | B1 * | 3/2007 | Chisenhall | F02B 67/04 123/195 A |
| 2009/0111630 | A1 * | 4/2009 | Kume | F16H 7/14 474/133 |

* cited by examiner

*Primary Examiner* — Jacob M Amick
(74) *Attorney, Agent, or Firm* — Paul M. Denk

(57) ABSTRACT

An adjustable bracket for alternator and related products, including an alternator that adjustably secures with the timing gear cover found on most vehicle engines, an offset mounting bracket securing with the gear cover, and having upwardly extending inclined arms, for connecting with the bottom of the alternator, and a tensioning arm also securing with the timing cover, having an integral bend upwardly towards its linear and arcuate portion, with the arcuate portions of the tensioning arm having a slot formed therein, through which an adjustment bolt secures with the upper part of the alternator, to allow for the alternator to be pivoted, about its offset mounting bracket, to apply the proper tensioning to its installed V belt, to attain its proper operations.

5 Claims, 6 Drawing Sheets

ADJUSTABLE BRACKET FOR ALTERNATOR AND RELATED PRODUCTS

CROSS REFERENCE TO RELATED APPLICATION

This non provisional patent application claims priority to the provisional application having Ser. No. 62/495,403, filed on Sep. 12, 2016.

FIELD OF THE INVENTION

This invention relates primarily to a bracket for use for electrical generating products, and more specifically, pertains to an adjustable bracket that is used to hold an alternator, and which can be adjusted in position for belt alignment and tightening, and more specifically for holding the alternator for a Model A Ford.

BACKGROUND OF THE INVENTION

There are a variety of patents that have issued upon various types of brackets, for use for holding an alternator, generator, or other electrical generating appliance in position. Such brackets are even available for use in the automotive field. Examples of these can be seen in the following patents.

Initially, U.S. Pat. No. DES. 330,154 to Thomas Wagner, the inventor herein, shows one of his early embodiments for an alternator bracket.

U.S. Pat. No. 4,887,993, shows an alternator belt tension adjustor, that includes a slotted bracket.

U.S. Pat. No. 8,506,435, shows a belt drive system assembly and tension apparatus.

Additional United States patents that show various generator devices for vehicles, can be seen in U.S. Pat. Nos. 5,742,108, 7,448,973, 9,296,296, 8,512,183, and 4,980,589. These are examples of prior art devices for use in conjunction with vehicle generators and alternators.

SUMMARY OF THE INVENTION

This invention relates generally to a bracket, and more specifically pertains to an alternator tensioner bracket, and more particularly for application within a vehicle structure.

This invention is designed to fit on all of the early Model A Ford engines. These types of alternators generally have a charging output of 7.5 volts, for the 6 volt unit, in addition to the 14.6 output volts for the 12 volt unit.

The structure of this mounting bracket includes a slight offset towards the front of the vehicle, and are generally secured to the timing gear cover that are installed on all of these early Model A type Ford engines. Various nut and washer arrangement can securely hold the bracket, through its holding bolts, to the timing gear cover.

Usually, these alternators have a specially designed pulley, and generally will not run properly with anything other than the actually ⅝ inch wide Model A belt. The belt can be tensioned by hand, and needs only be tightened enough to prevent its slippage. The belt tensioning is frequently tested, to assure that belt slippage does not occur. If it does, ammeter fluctuations can occur.

The invention further includes an offset mounting bracket, that also secures to the timing gear cover, and this allows for the alternator to be primarily mounted, and to furnish it with some degree of pivot, in order to obtain tightening of its operative belt. And, once the proper tensioning has been obtained, the tensioning arm, that is secured with the timing cover, can be fixed in position, so that the alternator is at its proper setting, providing the degree of tensioning required upon its belt, to assure the proper operations of the alternator, when generating charge for operations of the vehicle.

Wiring schematics are available for electrical connection with the alternator, and to the other electrical circuit connecting points, whether it be the starting motor, the battery, the lighting switches, the ignition switch, distributor, and all securing also with the spark plugs, to assure for the proper operation of this early Model A Ford engine.

It is, therefore, the principal object of this invention to provide an adjustable bracket for alternator and related products, primarily for use for adjustable tightening of the tensioning belt that extends from the vehicle crankshaft, and the water pump, and which can operate the alternator to generate electricity for the operations of the vehicle, in which it is installed.

Another object of this invention is to provide an offset mounting bracket that secures to the timing cover of a Model A Ford, the offset providing for the proper alignment of the V belt used to turn the alternator during its functioning.

Another object of this invention is to provide an offset mounting bracket that may be pivotally mounted during its initial installation, for holding the alternator in place, during its assembly.

A further object of this invention is to include a tensioning arm that secures with the timing cover and allows for the alternator to be adjustably pivoted, upon its mounting bracket, to assure that the proper tension for the V belt is attained to provide efficient operation of the alternator during its application and usage within the vehicle.

These and other objects may be come apparent to those skilled in the art upon review of the summary of the invention as provided herein, and upon undertaking a study of the description of its preferred embodiment, in view of the drawings.

BRIEF DESCRIPTION OF THE DRAWING

In referring to FIG. 1 is a perspective view of the tensioning arm showing this new design.

DESCRIPTION OF THE PREFERRED EMBODIMENT

This invention, as previously summarized, provides, more specifically, an alternator tensioner bracket that is used within Model A Ford, for securement of the alternator within the engine structure, and provides means for adjusting its tensioning, particularly upon the associated V belt, that provides for the rotation and energization of the alternator, during its functioning. More generally, this bracket could also be used with any of the variety of generators, alternators, for other vehicles, or for other mechanisms, where a tensioner bracket is required to maintain the proper tautness of the V belt, when installed and applied to such equipment, to provide for its turning and generation of electricity.

Figure 1:
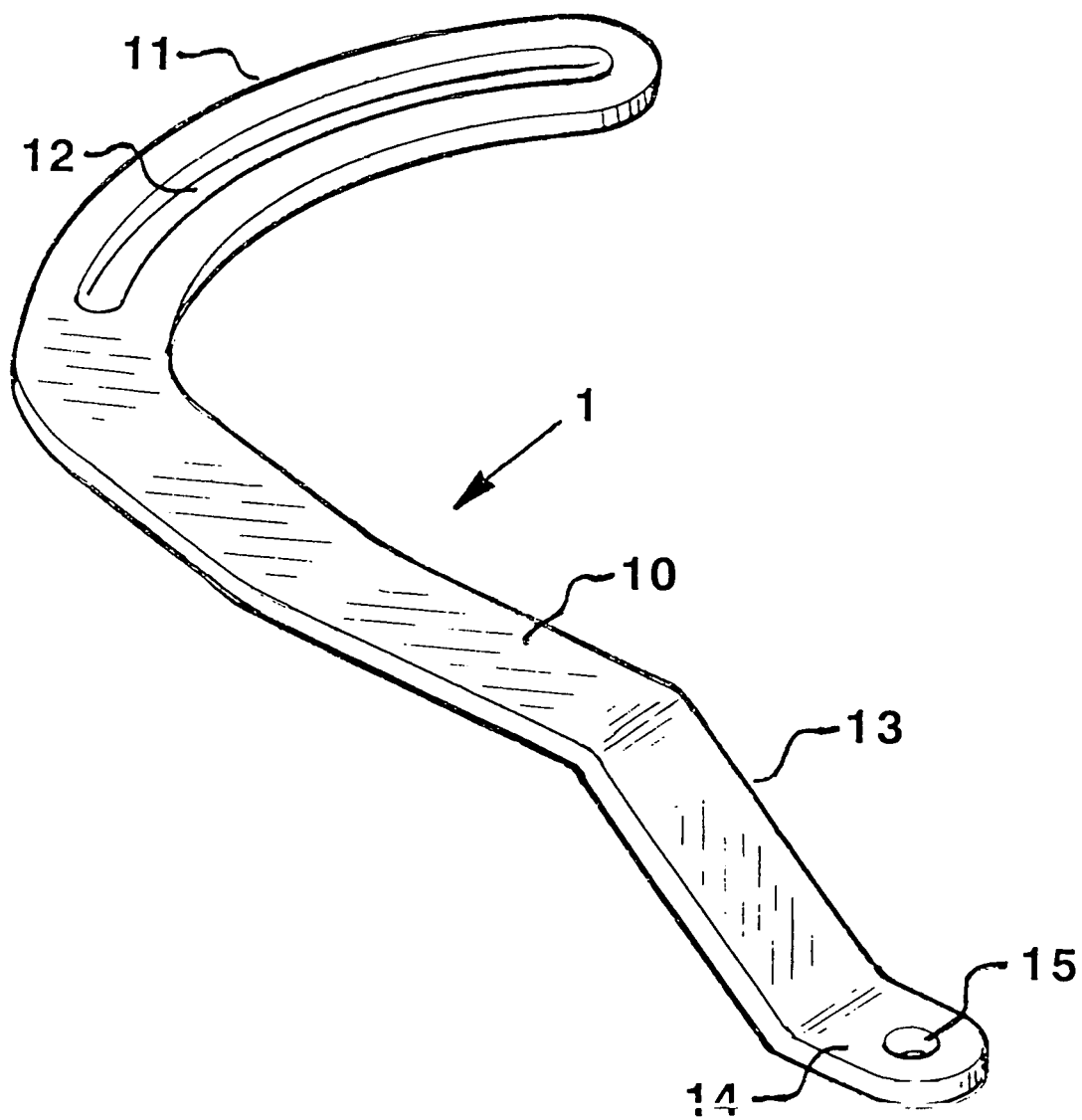
Figure 2:
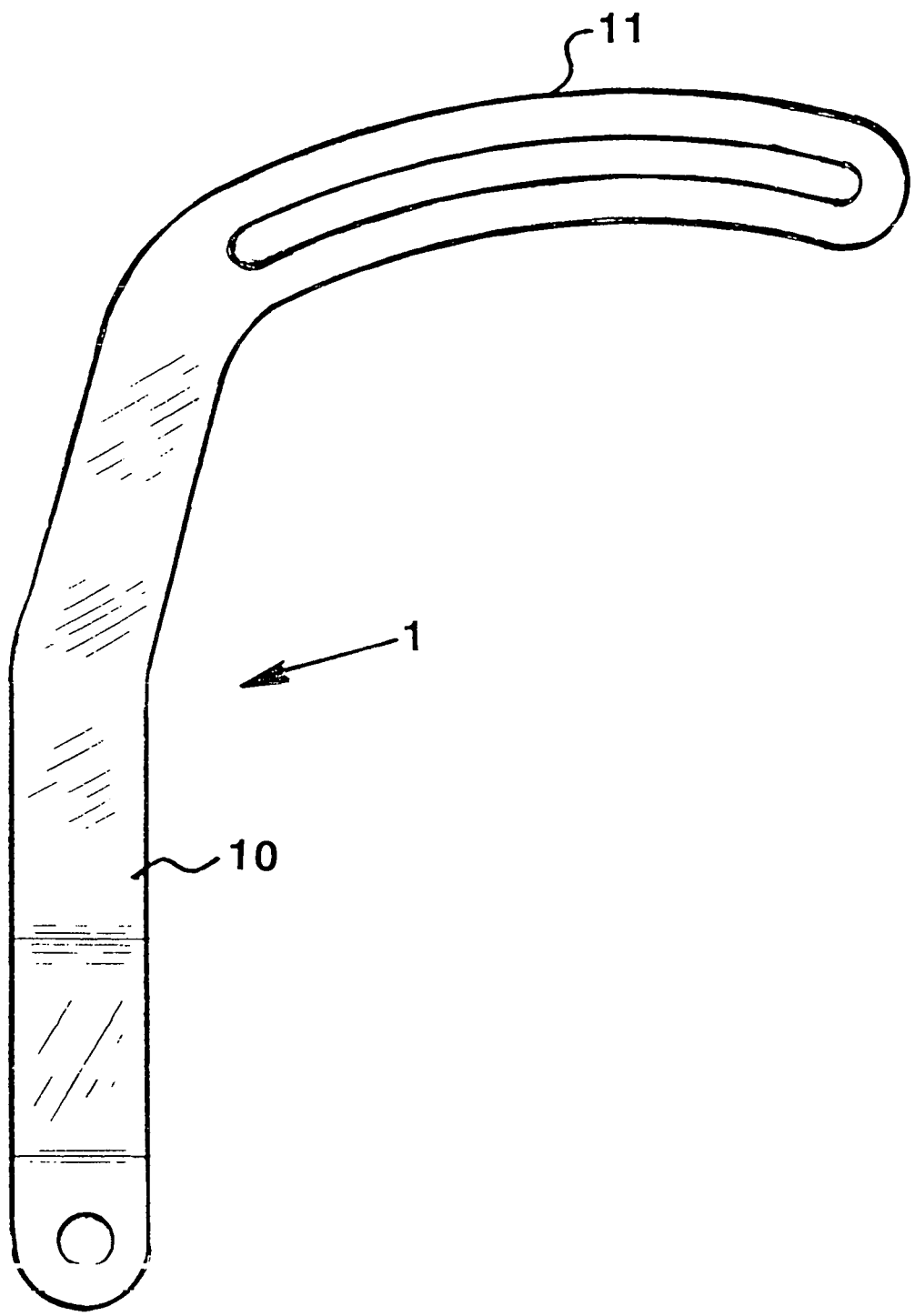
FIG. 2 is a front elevational view of the tensioning arm.
Figure 3:
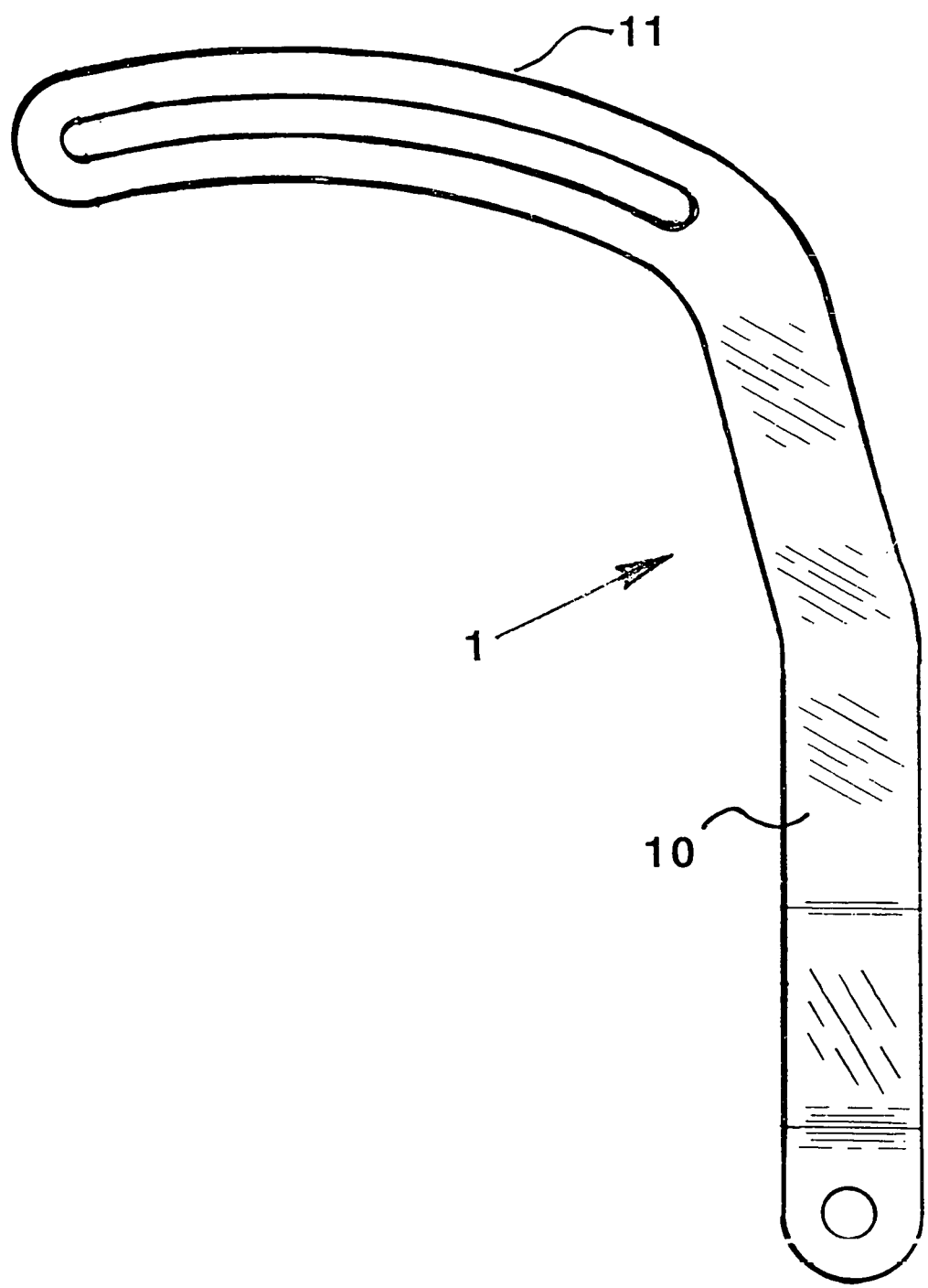
FIG. 3 is a rear elevational view of the tensioning arm.
Figure 4:
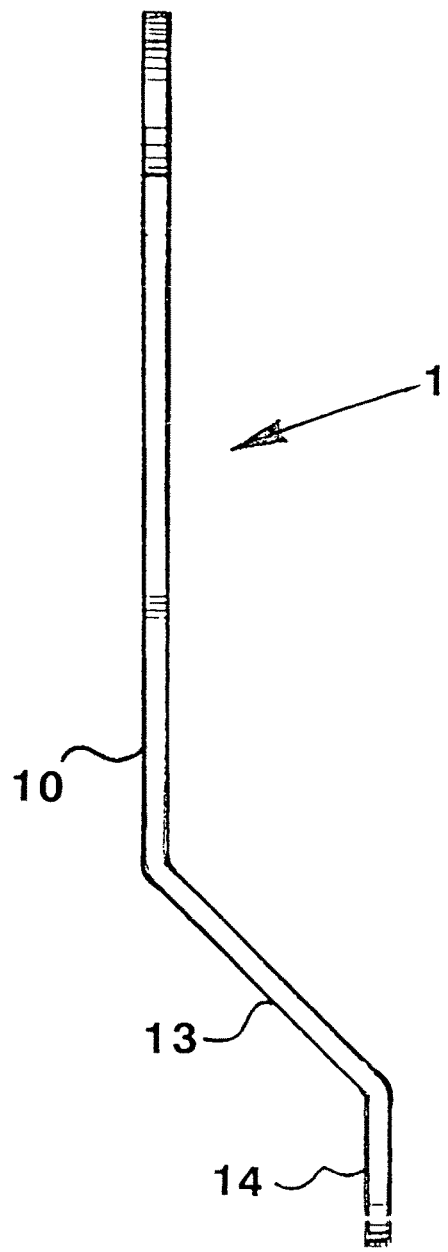
FIG. 4 is a right edge view of the tensioning arm.
Figure 5:
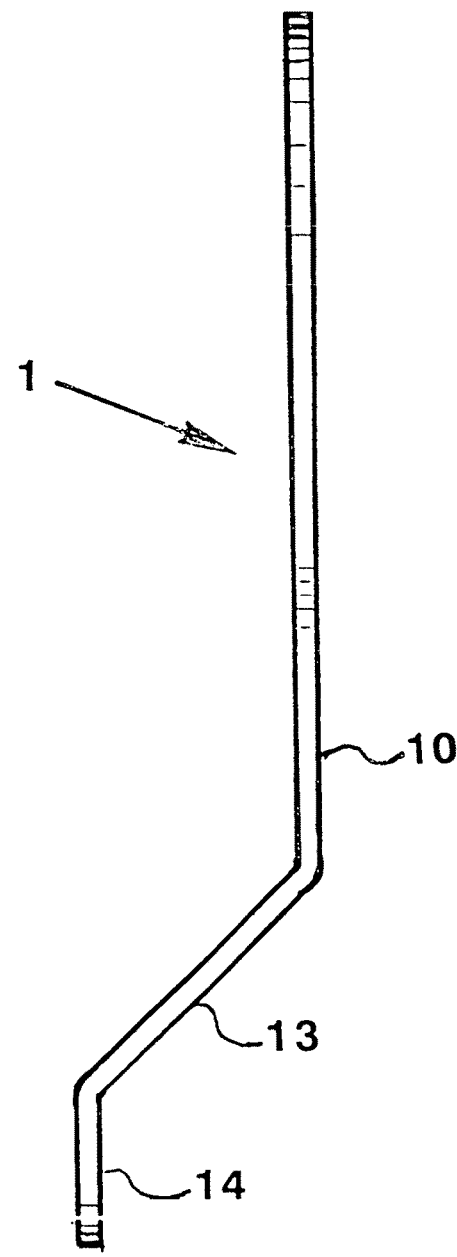
FIG. 5 is a left edge view of the tensioning arm.
Figure 6:
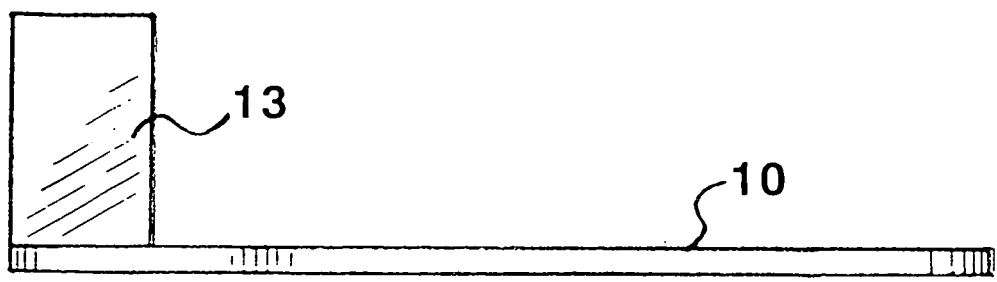
FIG. 6 is a top view of the tensioning arm.
Figure 7:
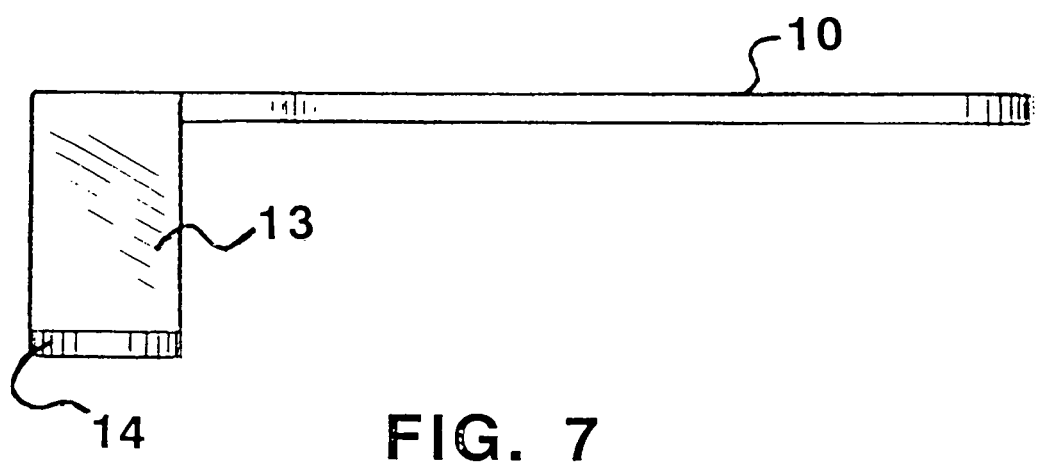
FIG. 7 is a bottom view of the tensioning arm.
Figure 8:
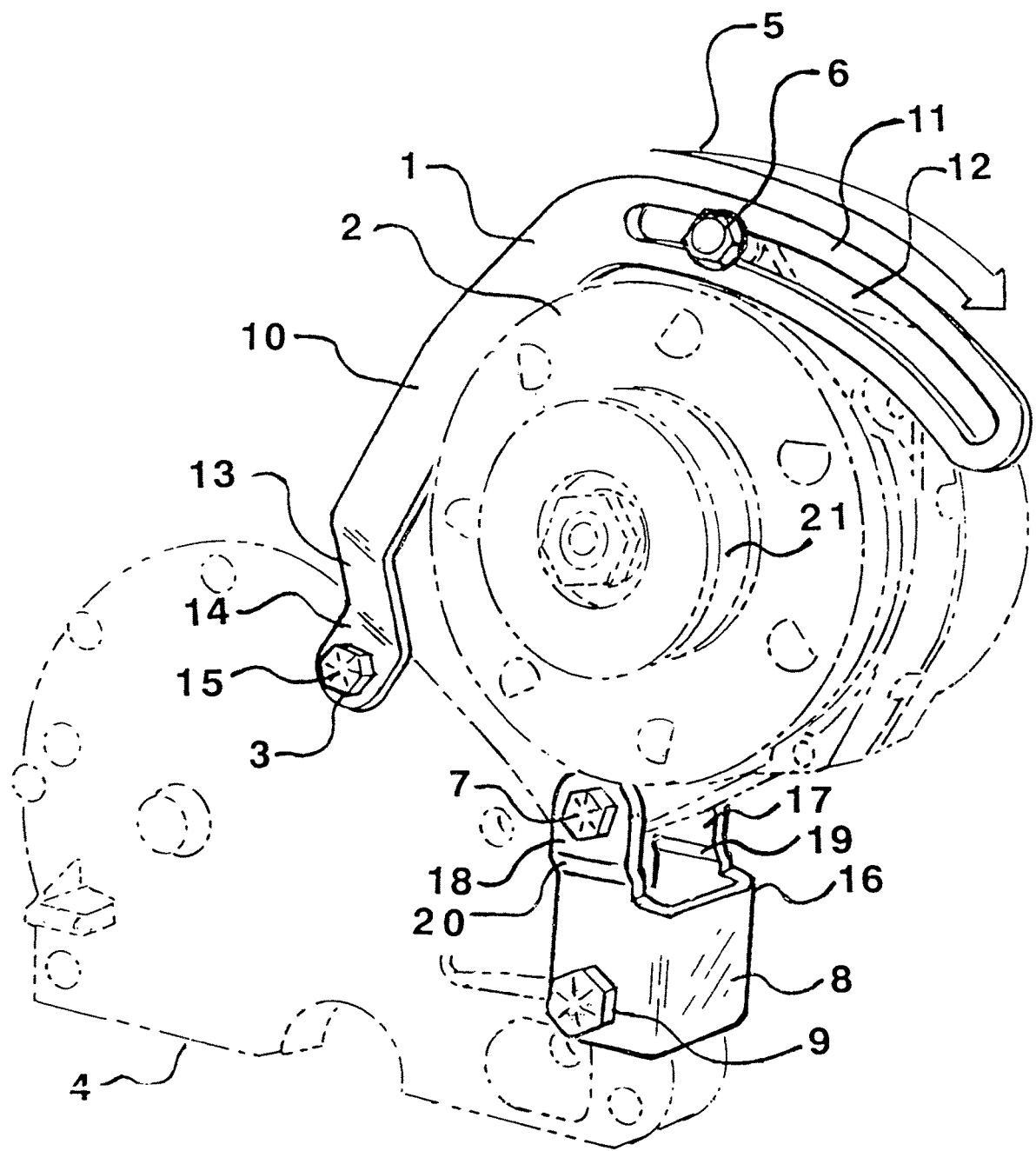
FIG. 8 shows a perspective view of the entire assembly, disclosing the alternator secured by its offset mounting bracket to the timing cover, and having the tensioning arm secured therewith to allow for the pivotal adjustment to be made to the alternator to assure that the proper alignment and tensioning upon its V belt is attained and sustains during operations of the device and its associated vehicle.

More specifically, as can be seen in FIGS. 1 through 7, the tensioner arm 1 that mounts directly to a timing gear cover 4, as noted in FIG. 8, and is secured by a cover bolt 3 that is used to anchor the tensioning arm 1, at the location of its shown end. The tensioner arm includes a somewhat linear portion 10, that is integral with an arcuate portion 11 and the arcuate portion has a corresponding slot, as at 12, that extends throughout its length, and through which the shown bolt 6, that attaches with the alternator, locates. As noted, the linear portion 10 of the tensioning arm has a slope offset portion 13, and which extends downwardly towards a further bent portion 14 that is generally parallel with the linear portion 10, as can be noted. Then, the previously identified cover bolt 3 can extend through the arm aperture 15, for its securement directly to the timing gear cover 4, as previously identified.

As can also be noted, the alternator offset mounting bracket 8 further secures somewhat downwardly to the timing gear cover, through the application of the bolt 9, that secures this offset mounting bracket to the cover, as can be seen.

The offset mounting bracket 8 includes a U shaped channel portion 16 and has a pair of upwardly extending integral arms 17 and 18, which are bent at a slight angle, as can be noted at 19 and 20, so as to bring the offset mounting bracket into alignment with the securing portion of the lower part of the alternator, through the application of the pivot bolt 7 through the arms 17 and 18, as can be seen. Thus, when the alternator is secured by means of this offset bracket, and the tensioning arm, through connection of its various bolts 6 and 7, the alternator is properly aligned for application of a V belt directly to the alternator 2, and places it in alignment with the crank shaft, and water pump, that drives the V belt, for providing rotation to the alternator, to attain its functioning. As can be understood, if the pivot bolt 7 is slightly loosened, and the arm bolt 6 is loosened, the alternator may then be pivoted, relative to the arcuate slot 12 of the tensioning arm 11, in order to pivot the alternator further outwardly, as can be understood, to provide the proper tensioning to its supplied V belt, and when such is attained, the bolt 6, and the bolt 7, can be tightly secured, to affix the alternator in position, having the proper tensioning upon the V belt, so that it does not slip, and efficiently drives the alternator in rotation, during its functioning.

The only time the bolt 3 will be loosened, is when the bracket is initially installed with the alternator to the timing gear cover 4, so as to place the tensioning arm and its slot 12 into position for allowing the alternator to circumferentially pivot, relative to the tensioning arm, so as to provide for future adjustments of the alternator, and its V belt, in preparation for installation and usage.

As can be noted, the V belt generally is applied to the pulley structure 21 of the alternator, when it is installed for usage. And, in order to maintain the proper and adequate alignment of the V belt, with the water pump and crankshaft, it is necessary that various offsets be provided, such as noted at 13 as integrally formed of the tensioning arm 1, and in addition, as can be seen at 19 and 20, for the upwardly extending arms 17 and 18, respectively, of the offset mounting bracket 8 of this device.

Variations and modifications to the subject matter of this invention may occur to those skilled in the art upon review of the structure of this device as described herein. Such variations, if within the spirit of this invention, are intended to be encompassed within the scope of any claims to patent protection issuing herein. The detailed description of the invention as set forth herein, and as depicted in the drawings, are set forth for illustrative purposes only.

I claim:

1. An adjustable bracket for connecting an alternator to a motor of a vehicle, the motor comprising a timing gear cover:

said adjustable bracket including an offset mounting bracket and a tensioning arm, said offset mounting bracket for connecting with the timing gear cover for the motor of the vehicle, and said offset mounting bracket securing with a bottom of the alternator when assembled, said tensioning arm having an integral linear portion, and an integral arcuate portion, said linear portion of said tensioning arm at one end securing with the timing gear cover, and said arcuate portion of the tensioning arm provided for accommodating the securement of the tensioning arm to the alternator, and a series of bolts securing said offset mounting bracket and tensioning arm to the alternator and the timing cover, whereby when said bolts securing the alternator to the tensioning arm and the offset mounting bracket are loosened, the alternator, upon installation of an accompanying V-belt, is adjustable into a tensioning position to provide a proper tautness to the V-belt during the usage of the V-belt in the actuation of the alternator, and once the proper tautness of the V-belt tensioning is achieved, said bolts securing the alternator to the offset mounting bracket and to said tensioning arm are capable of being tightened to secure the alternator and the V-belt into a proper installed position.

2. The adjustable bracket of claim 1, wherein, said offset mounting bracket having a channel shaped portion, for securement with the timing gear cover, and said channel shaped portion having a pair of upstanding arms, the upstanding arms provided for accommodating the bolts for securement of the offset mounting bracket to the bottom of the alternator.

3. The adjustable bracket of claim 2, wherein said upstanding arms of the offset mounting bracket are outwardly bent to provide for their offset from the integral U-shaped bracket to accommodate the bottom of the alternator within said upstanding arms.

4. The adjustable bracket of claim 1, wherein said integral linear tensioning arm at said one end has an offset at from its proximate location of connection to the timing gear cover.

5. The adjustable bracket of claim 4, wherein the linear portion of said tensioning arm integrally includes an angulated part portion, and an integral downwardly extending portion at said one end, wherein the downwardly extending portion and the linear portion of the tensioning arm are parallel.

* * * * *